US012191093B2

(12) United States Patent
Rusev et al.

(10) Patent No.: US 12,191,093 B2
(45) Date of Patent: Jan. 7, 2025

(54) INSULATOR WITH ASYMMETRIC SHEDS

(71) Applicant: S&C Electric Company, Chicago, IL (US)

(72) Inventors: Tsvetan Rusev, Morton Grove, IL (US); Adam Gardner, Hendersonville, TN (US); Xiaoguang Qi, Northbrook, IL (US)

(73) Assignee: S&C Electric Company, Chicago, IL (US)

( * ) Notice: Subject to any disclaimer, the term of this patent is extended or adjusted under 35 U.S.C. 154(b) by 163 days.

(21) Appl. No.: 18/075,860

(22) Filed: Dec. 6, 2022

(65) Prior Publication Data

US 2023/0238202 A1 Jul. 27, 2023

Related U.S. Application Data

(60) Provisional application No. 63/301,827, filed on Jan. 21, 2022.

(51) Int. Cl.
*H01H 33/662* (2006.01)
*H01H 33/664* (2006.01)
*H01H 33/666* (2006.01)

(52) U.S. Cl.
CPC .... *H01H 33/664* (2013.01); *H01H 33/66207* (2013.01); *H01H 33/6662* (2013.01)

(58) Field of Classification Search
CPC ........... H01H 33/664; H01H 33/66207; H01H 33/6662; H01H 33/666; H01H 33/53; H01H 2033/6623; H01H 31/006; H01H 2223/002; H01B 17/00; H01B 17/52; H01B 17/525; H01B 17/48
USPC ......................... 218/123, 134, 138, 139, 118
See application file for complete search history.

(56) References Cited

U.S. PATENT DOCUMENTS 5,597,992 A * 1/1997 Walker ............... H01H 33/6606 218/138
5,917,167 A * 6/1999 Bestel .............. H01H 33/66207 218/138
7,148,441 B2 * 12/2006 Daharsh ................. H01H 33/24 218/138

(Continued)

FOREIGN PATENT DOCUMENTS

CN 113421726 A 9/2021
WO 0123691 A1 4/2001
WO 2020219899 A1 10/2020

OTHER PUBLICATIONS

International Search Report and Written Opinion for International Application No. PCT/US2022/51960 dated Mar. 20, 2023. (8 pages).

*Primary Examiner* — William A Bolton

(57) ABSTRACT

An insulator that has particular application for enclosing a switching device, such as a vacuum interrupter. The insulator includes a body having a top portion and a bottom portion, and a plurality of ring-shaped sheds extending from the body between the top portion and the bottom portion. The sheds are asymmetrical in an axial direction such that an axial dimension of the sheds at one side towards the front of the switching device is shorter than an axial dimension of the sheds at an opposite side towards the rear of the switching device. The axial dimension of the sheds uniformly increases from the one side to the opposite side.

20 Claims, 4 Drawing Sheets

(56) References Cited

U.S. PATENT DOCUMENTS

| | | | | |
|---|---|---|---|---|
| 7,473,863 | B2 * | 1/2009 | Schreiber | H01H 33/027<br>218/138 |
| 10,453,633 | B2 * | 10/2019 | Wang | H01H 33/66207 |
| 11,469,062 | B1 * | 10/2022 | Hendrix | H01H 33/121 |
| 2013/0228432 | A1 * | 9/2013 | Borgstrom | H01H 31/023<br>200/48 R |
| 2022/0044894 | A1 * | 2/2022 | Nault | H02B 1/36 |
| 2022/0216022 | A1 * | 7/2022 | Shamseldin | H01H 33/66207 |
| 2022/0335293 | A1 * | 10/2022 | Choi | G06N 3/063 |

* cited by examiner

INSULATOR WITH ASYMMETRIC SHEDS

CROSS-REFERENCE TO RELATED APPLICATION

This application claims the benefit of priority from the U.S. Provisional Application No. 63/301,827, filed on Jan. 21, 2022, the disclosure of which is hereby expressly incorporated herein by reference for all purposes.

BACKGROUND

Field

This disclosure relates generally to an insulator including a series of asymmetrical sheds and, more particularly, to an insulator including a series of asymmetrical sheds that has particular application as an outer housing for a switching device.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three phase feeders including three single phase feeder lines that carry the same current but are 120° apart in phase, three phase and single-phase lateral lines are tapped off of the feeder that provide the medium voltage to various distribution transformers, where the voltage is stepped down to a low voltage and is provided to loads, such as homes, businesses, etc. Power distribution networks of the type referred to above typically include switching devices, breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

A vacuum interrupter is a switch including a vacuum chamber that encloses a fixed contact that is electrically coupled to a unit top contact and a movable contact that is electrically coupled to a unit bottom contact, where the fixed and movable contacts are in contact with each other within the vacuum chamber when the vacuum interrupter is closed. When the vacuum interrupter is opened by moving the movable contact away from the fixed contact to prevent current flow through the interrupter a plasma arc is created between the contacts that is extinguished by the vacuum at a zero current crossing. The separated contacts in vacuum provide dielectric strength that exceeds power system voltage and prevents current flow. The vacuum interrupter housing supports the contact structures and is an insulator, typically ceramic, to provide dielectric strength.

Fault interrupters, for example, single-phase self-powered reclosers that employ vacuum interrupters and magnetic actuators, are provided on utility poles and in underground circuits along a power line to allow or prevent power flow downstream of the recloser. These reclosers typically detect the current and/or voltage on the line to monitor current flow and have controls that indicate problems with the network circuit, such as detecting a high current fault event. If such a high fault current is detected the recloser is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open, where the time between detection tests may increase after each test.

These types of interrupters, reclosers and similar switching devices are often secured to a mounting assembly that is mounted to a utility pole. The mounting assembly needs to be designed so that the distance between a conductor at one end of the mounting assembly connected to one end connector of the device and a conductor at an opposite end of the mounting assembly connected to an opposite end connector of the device is far enough so that there is no conduction between the conductors through the air.

Typically, these types of devices have an outer housing made of a durable solid insulating material. It is also necessary to prevent conduction along an outer surface of the outer housing between the conductor at the one end of the mounting assembly and the conductor at the opposite end of the mounting assembly, where the path along the surface is known as the creepage distance. To help prevent insulation failure due to tracking, the housing is often over-molded with a silicone rubber insulation. These insulators often include ring-like sheds that increase the creepage distance so as to help reduce the chance of tracking along the surface. These sheds also operate to protect part of the insulator from being contaminated with salt, pollution, etc. that could increase the conduction, and they break up long water streams and block arc propagation. The number, size, spacing, etc. of the sheds is determined by the voltage class and the pollution class of the device.

The known designs of the sheds used for this purpose are axially symmetrical ring members of uniform diameter spaced at regular intervals that extend away from the device towards the front of the device. However, this symmetrical design of the known sheds limits or restricts access to a mounting ring at a top of the device, and other components, by a hot stick, or otherwise, that affects the ability to install and remove the device to and from the mounting assembly, and operate the device.

SUMMARY

The following discussion discloses and describes an insulator that has particular application for enclosing a switching device, such as a vacuum interrupter. The insulator includes a body having a top portion and a bottom portion, and a plurality of ring-shaped sheds extending from the body between the top portion and the bottom portion. The sheds are asymmetrical in an axial direction such that an axial dimension of the sheds at one side towards the front of the switching device is shorter than an axial dimension of the sheds at an opposite side towards the rear of the switching device. The axial dimension of the sheds uniformly increases from the one side to the opposite side. In one embodiment, the plurality of sheds is three equally spaced sheds, where the shed closest to the top portion has a larger diameter than the other two sheds. In another embodiment, the plurality of sheds is two sheds, where the shed closest to the top portion is a crescent-shaped shed with an open portion towards the one side.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an insulator including a series of asymmetrical sheds is merely exemplary in nature, and is in no way intended to limit the disclosure or its applications or uses. For example, the insulator is described below as being part of a switching device including a vacuum interrupter, such as cutout mounted, single-phase, self-powered, magnetically actuated recloser. However, as will be appreciated by those skilled in the art, the insulator may have other applications.

Figure 1:
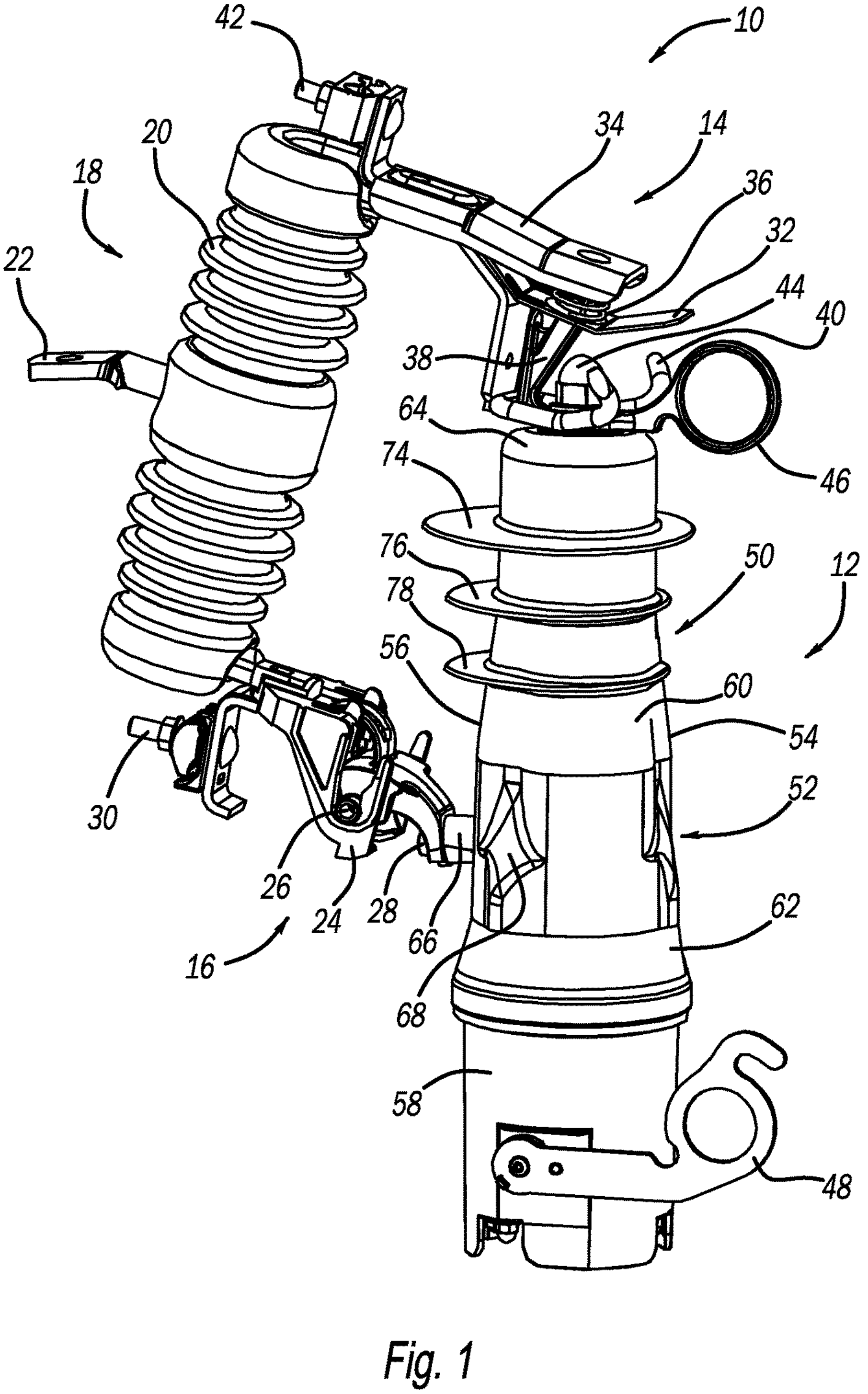
FIG. 1 is an isometric view of a switch assembly connected to a pole mounted insulator and including a single-phase, self-powered, magnetically actuated switching device.

FIG. 1 is an isometric view of a pole mounted switch assembly 10 including a cutout mounted, single-phase, self-powered, magnetically actuated switching device 12 that is intended to represent any interrupting switching device suitable for the purposes discussed herein. The switching device 12 is coupled to an upper contact assembly 14 at a top end and a mounting hinge assembly 16 at a bottom end. The contact assembly 14 is secured to a top end of an insulator 18 having skirts 20 and the mounting hinge assembly 16 is secured to a bottom end of the insulator 18, where the insulator 18 is mounted to a bracket 22 that may be attached to a utility pole (not shown). The mounting hinge assembly 16 includes a channel catch 24 that accepts a trunnion rod 26 coupled to the device 12 and that is electrically coupled to a unit bottom contact 28 of the device 12. A connector 30 accepts a wire (not shown) at a load side of the device 12 that is electrically coupled to the unit bottom contact 28. The contact assembly 14 includes a top mounting tab 32, an extension tab 34 and a spring 36 positioned between the tabs 32 and 34. The contact assembly 14 also includes a support member 38 secured to the extension tab 34 and a pair of mounting horns 40 coupled to and extending from the support tab 38 opposite to the extension tab 34. A connector 42 accepts a wire (not shown) at a source side of the device 12 that is electrically coupled to a unit top contact 44 of the device 12 through the contact assembly 14. A guiding pull ring member 46 is coupled to a top of the device 12 and allows a worker to easily install and remove the device 12 from the insulator 18 by pulling on the ring member 46 to disconnect the device 12 from the contact assembly 14, rotating the device 12 outward on the trunnion rod 26 and then lifting the device 12 out of the catch 24.

The switching device 12 includes a vacuum interrupter assembly 50 having a vacuum interrupter (not shown) that is representative of any vacuum interrupter assembly known in the art for medium voltage uses that is suitable for the purposes discussed herein. The vacuum interrupter assembly 50 has a forward side 54 that faces away from the insulator 18 and rearward side 56 that faces towards the insulator 18. The assembly 50 also includes an outer insulator 52 that is typically a single piece molded silicone rubber material having a desired thickness that conforms to a vacuum interrupter housing (not shown). The length of the vacuum interrupter assembly 50, and thus the length the insulator 52, is designed for a particular size of the insulator 18 and other design features. The switching device 12 also includes an enclosure 58 extending from the insulator 52 that encloses a magnetic actuator or other device that opens and closes the vacuum interrupter, various electronics, controllers, energy harvesting devices, sensors, communications devices, etc. consistent with the discussion herein. A lever 48 allows the switching device 12 to be manually opened and closed using any suitable technique.

Figure 2:
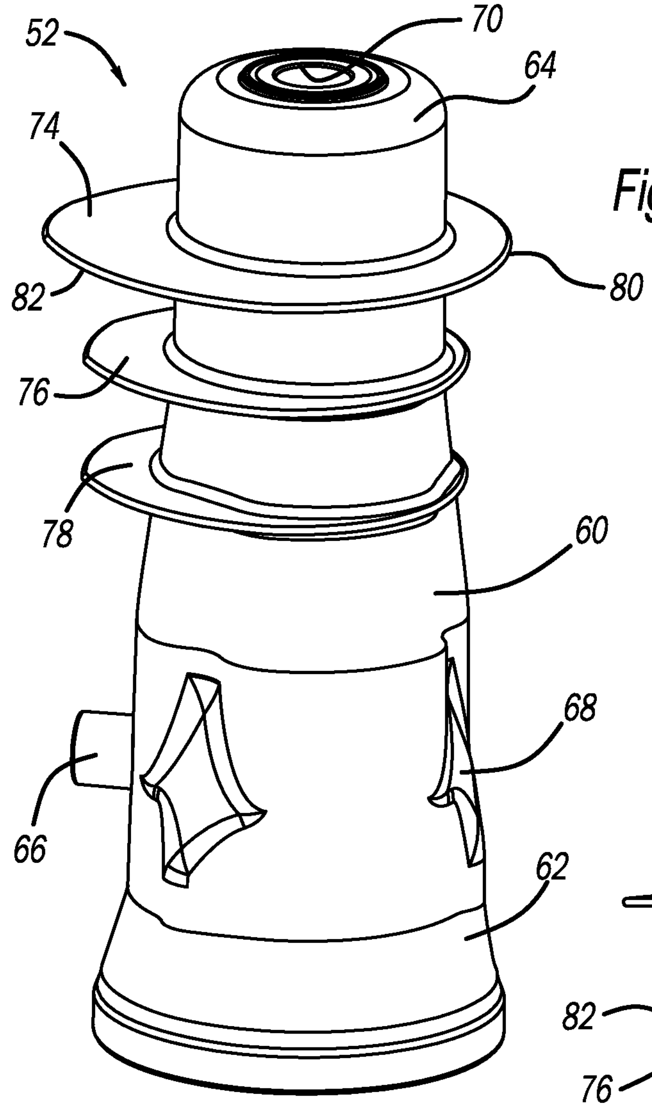
FIG. 2 is an isometric view of an outer insulator separated from the switching device shown in FIG. 1.
Figure 3:
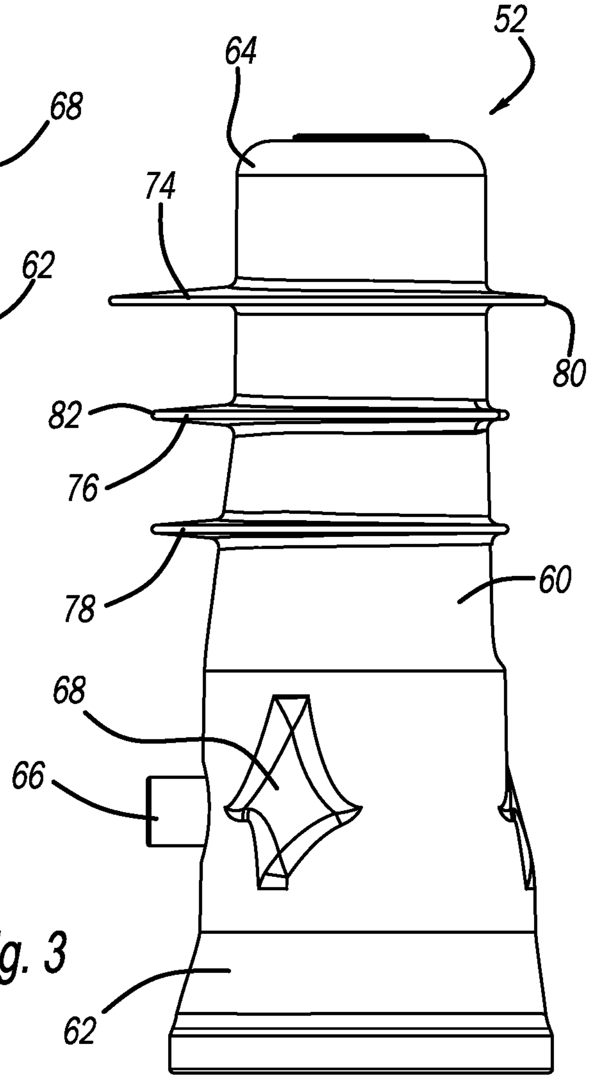
FIG. 3 is a side view of the outer insulator shown in FIG. 2.
Figure 4:
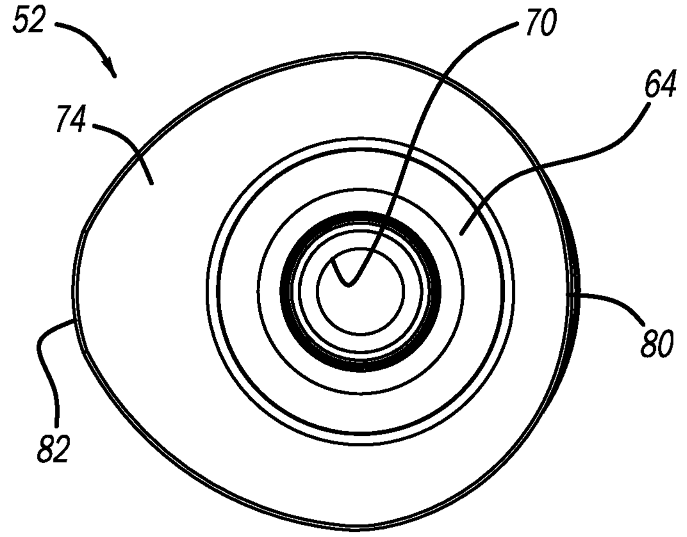
FIG. 4 is a top view of the outer insulator shown in FIG. 2.

FIG. 2 is an isometric view, FIG. 3 is a side view and FIG. 4 is a top view of the insulator 52 separated from the vacuum interrupter assembly 50. As discussed above, the insulator 52 is designed to prevent electrical current from by-passing the vacuum interrupter and traveling along an outer surface of the assembly 50 from the contact 44 to the contact 28. The insulator 52 includes a generally cylindrical and slightly flared body 60 having an open flared bottom portion 62, a top portion 64 having an opening 70 through which extends the contact 44 and a side port 66 through which extends the contact 28. In one embodiment, the body 60 is about three inches in diameter and the bottom portion 62 is about four inches in diameter. The body 60 also includes a series of three indentations 68 that are spaced 120° apart around the body 60 that provide an integrated handgrip for a gloved hand to hold onto the switching device 12 when, for example, installing and removing it. Lineman are required to wear gloves, which reduces dexterity, and thus the indentations 68 improve the ability to hold onto the device 12.

In order to increase the creepage distance between the contacts 28 and 44, the insulator 52 includes three spaced apart annular sheds 74, 76 and 78 extending around the body 60 and provided proximate the top portion 64. In this non-limiting design, the spacing between the sheds 74 and 76 is the same as the spacing between the sheds 76 and 78, although other designs may not provide such equal spacing. The sheds 74, 76 and 78 are axially asymmetrical and have a non-uniform diameter configuration in that a front side 80 axial dimension of the sheds 74, 76 and 78 is shorter than a rear side 82 axial dimension of the sheds 74, 76 and 78, where the axial width of the sheds 74, 76 and 78 uniformly increases from the front side 80 to the rear side 82 so that the sheds 74, 76 and 78 have a general lopsided appearance. Further, the shed 74 has a larger diameter than the sheds 76 and 78, where the diameter of the sheds 76 and 78 is about the same. This allows the sheds 74, 76 and 78 to not stick out as far as the known sheds at the front side 54 of the switching device 12, which provides better access to the ring member 46 and other components to allow a worker to more easily attach and detach the switching device 12 using a hot stick or other tool. The uniform increase in the shed width in the axial direction from the front side 80 to the rear side 82 makes the distance from the top contact 44 to the bottom contact 28 on any creepage distance path along the body 60 and over the sheds 74, 76 and 78 to be about the same, thus providing uniform electrical stresses along the body 60.

The placement of the sheds 74, 76 and 78, their relative size and the variable radial length of the sheds 74, 76 and 78 from center are determined by the creepage distance, water shedding capability, internal and external electrical stresses on the device 12 and physical access to the device 12. The design of the sheds 74, 76 and 78 specifically takes advantage of the lower electrical stresses at the front side 54 of the insulator 52 by reducing the size of the sheds 74, 76 and 78 in this area or eliminating them. The asymmetrical shed design having a constant creepage distance along any path between the conductors 44 and 28 as described provides all of the required system ratings. More specifically, the asymmetric geometry of the sheds 74, 76 and 78 is such that all paths along the surface of the insulator 52 have an adequate creepage distance. As mentioned, the asymmetrical configuration of the sheds 74, 76 and 78 offers ease of access for installation and operation of the device 12. More specifically, a lineman can access the ring member 46, and other components on the device 12, from a more direct or straight-down angle relative to the device 12 as opposed to an angle more outward from the device 12 as was necessary for known devices having symmetrical sheds. Further, the asymmetrical configuration of the sheds 74, 76 and 78 reduces the amount of shed material over known shed designs, and thus reduces the overall cost and weight of the insulator 52 over those designs.

Figure 5:
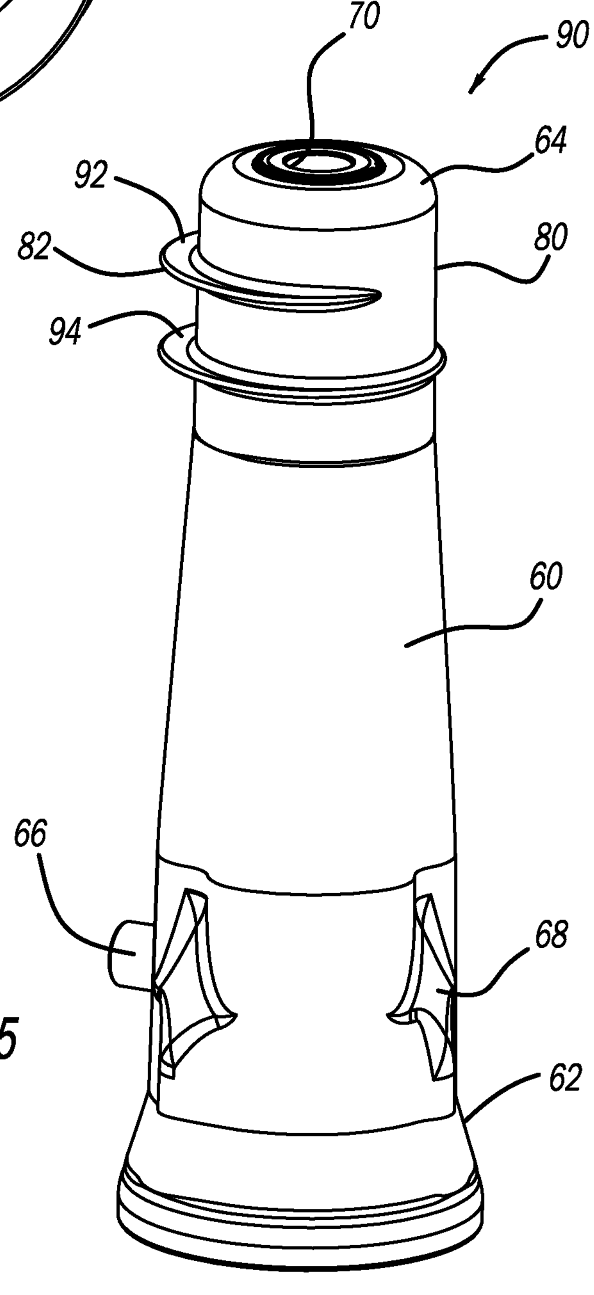
FIG. 5 is an isometric view of an outer insulator that can replace the insulator shown in FIG. 2.
Figure 6:
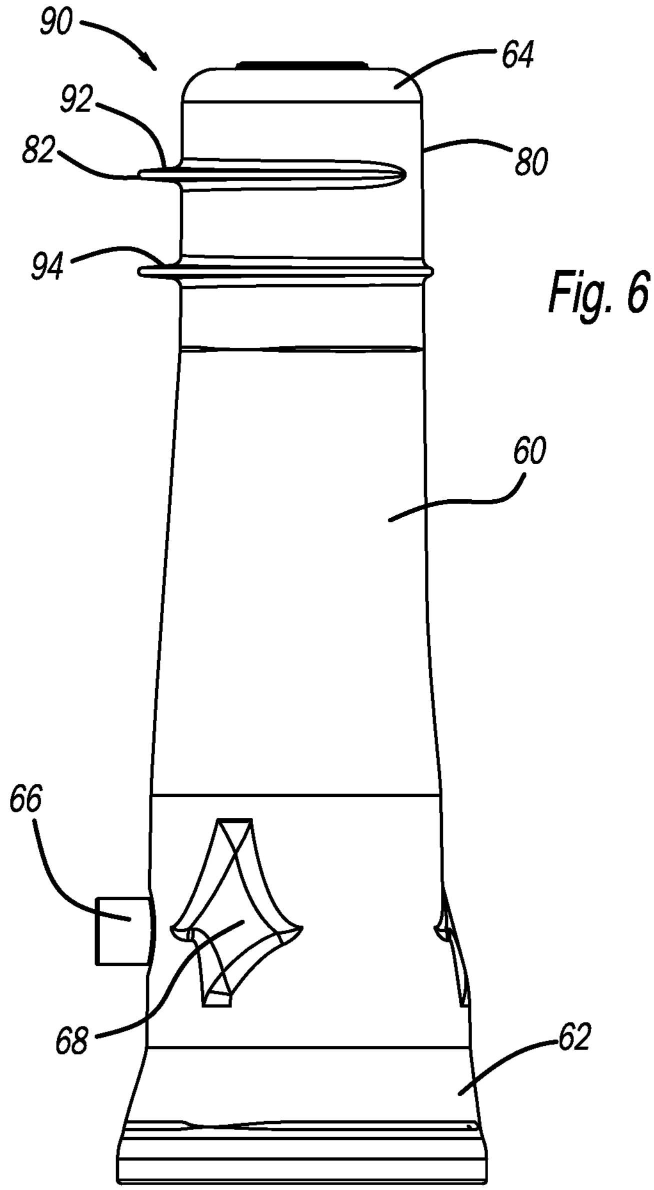
FIG. 6 is a side view of the outer insulator shown in FIG. 5.
Figure 7:
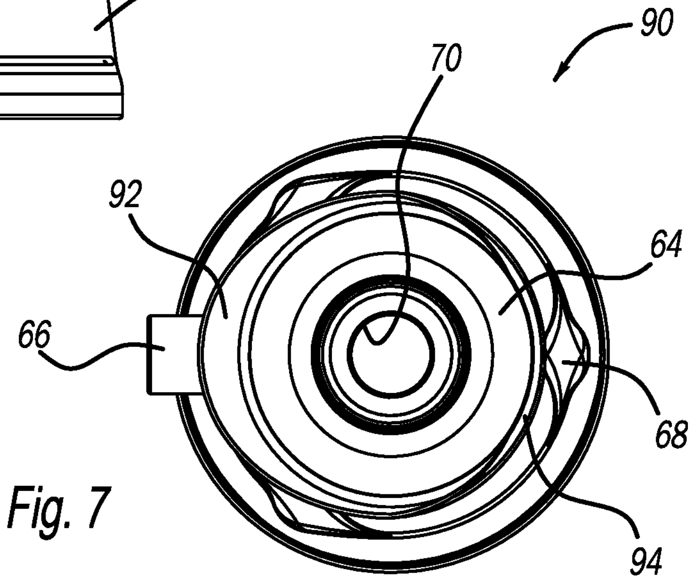
FIG. 7 is a top view of the outer insulator shown in FIG. 5.

The length of the switching device 12 and thus the length of the insulator 52 may be longer and narrower for other configurations. For those designs, the creepage distance along the body 60 is increased, and thus, for the same voltages, the size and/or number of the sheds can be reduced. FIG. 5 is an isometric view, FIG. 6 is a side view and FIG. 7 is a top view of an insulator 90 for a longer switching device illustrating this embodiment, where like elements to the insulator 42 are identified by the same reference number. In this design, the three sheds 74, 76 and 76 are replaced with two sheds, namely, a top shed 92 and a bottom shed 94 provided proximate the top portion 64. The sheds 92 and 94 also have the general asymmetrical and lopsided configuration as the sheds 74, 76 and 78, but have a smaller axial width than the sheds 74, 76 and 78. Further, the top shed 92 is open at the front side 80 and thus has a general partial crescent shape. As above, the creepage distance from the top contact 44 to the bottom contact 28 on any path along the body 60 and over the sheds 92 and 94 is about the same.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An insulator comprising:

a body having a top portion and a bottom portion; and a plurality of ring-shaped sheds extending from the body between the top portion and the bottom portion, the sheds being asymmetric in an axial direction such that an axial dimension of the sheds at one side is shorter than an axial dimension of the sheds at an opposite side.

2. The insulator according to claim 1 wherein the axial dimension of the sheds uniformly increases from the one side to the opposite side.

3. The insulator according to claim 1 wherein the body includes a plurality of indentations formed between the plurality of sheds and the bottom portion.

4. The insulator according to claim 3 wherein the plurality of indentations is three equally spaced indentations.

5. The insulator according to claim 1 wherein the plurality of sheds is three equally spaced apart sheds.

6. The insulator according to claim 5 wherein the shed closest to the top portion has a larger diameter than the other two sheds.

7. The insulator according to claim 1 wherein the plurality of sheds is two sheds.

8. The insulator according to claim 7 wherein the shed closest to the top portion is a crescent-shaped shed with an open portion towards the one side.

9. An insulator comprising:

a body having a top portion and a bottom portion, the body including a plurality of equally spaced indentations formed between the top portion and the bottom portion; and a plurality of ring-shaped sheds extending from the body between the top portion and the indentations, the sheds being asymmetric in an axial direction such that an axial dimension of the sheds at one side is shorter than an axial dimension of the sheds at an opposite side, wherein the axial dimension of the sheds uniformly increases from the one side to the opposite side.

10. The insulator according to claim 9 wherein the plurality of sheds is three equally spaced apart sheds, wherein the shed closest to the top portion has a larger diameter than the other two sheds.

11. The insulator according to claim 9 wherein the plurality of sheds is two sheds, wherein the shed closest to the top portion is a crescent-shaped shed with an open portion towards the one side.

12. A switching device comprising:

a switch having a front side and a rear side; and an outer insulator formed over the switch, the insulator including a body having a top portion and a bottom portion, the insulator further including a plurality of ring-shaped sheds extending from the body between the top portion and the bottom portion, the sheds being asymmetric in an axial direction such that an axial dimension of the sheds at the front side is shorter than an axial dimension of the sheds at the rear side.

13. The device according to claim 12 wherein the axial dimension of the sheds uniformly increases from the front side to the rear side.

14. The device according to claim 12 wherein the body includes a plurality of indentations formed between the plurality of sheds and the bottom portion.

15. The device according to claim 14 wherein the plurality of indentations is three equally spaced indentations.

16. The device according to claim 12 wherein the plurality of sheds is three equally space apart sheds.

17. The device according to claim 16 wherein the shed closest to the top portion has a larger diameter than the other two sheds.

18. The device according to claim 12 wherein the plurality of sheds is two sheds.

19. The device according to claim 18 wherein the shed closest to the top portion is a crescent-shaped shed with an open portion towards the front side.

20. The device according to claim 12 wherein the switch is a vacuum interrupter and the device is part of a self-powered magnetically actuated recloser.

* * * * *